US008723099B2

(12) United States Patent
Itano et al.

(10) Patent No.: US 8,723,099 B2
(45) Date of Patent: May 13, 2014

(54) SOLID-STATE IMAGING APPARATUS

(75) Inventors: Tetsuya Itano, Sagamihara (JP); Hiroki Hiyama, Sagamihara (JP); Kazuhiro Saito, Tokyo (JP); Kohichi Nakamura, Kawasaki (JP); Koichiro Iwata, Kawasaki (JP); Yu Maehashi, Kawasaki (JP); Takeshi Akiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/608,145

(22) Filed: Sep. 10, 2012

(65) Prior Publication Data
US 2013/0087685 A1 Apr. 11, 2013

(30) Foreign Application Priority Data

Oct. 7, 2011 (JP) .................................. 2011-223118
Jun. 28, 2012 (JP) .................................. 2012-145713

(51) Int. Cl.
*G01J 1/44* (2006.01)
*H01L 27/14* (2006.01)

(52) U.S. Cl.
USPC .................................... 250/214 R; 250/208.1

(58) Field of Classification Search
CPC .................................... G01J 1/44; H01L 27/14
USPC ............ 250/214 R, 208.1; 348/300, 308–311
See application file for complete search history.

(56) References Cited

U.S. PATENT DOCUMENTS

2010/0309356 A1* 12/2010 Ihara et al. ..................... 348/300
2011/0134295 A1*  6/2011 Shigeta et al. ................. 348/300
2011/0279720 A1* 11/2011 Nakagawa et al. ............ 348/300
2012/0312965 A1* 12/2012 Yamashita et al. .......... 250/208.1

FOREIGN PATENT DOCUMENTS

JP         2003-51989 A1     2/2003

* cited by examiner

*Primary Examiner* — Seung C Sohn
(74) *Attorney, Agent, or Firm* — Canon USA, Inc. IP Division

(57) ABSTRACT

An imaging apparatus includes a plurality of unit pixels arranged in a matrix and configured to generate a signal by photoelectric conversion, a plurality of pixel output lines connected to each column of the unit pixels, a plurality of column amplifiers configured to amplify a signal of the pixel output lines, and a driving circuit configured to generate a control signal of the column amplifiers. Each of the column amplifiers includes first and second input terminals, an output terminal, an input capacitance between the first and second input terminals, and a first switch between the second input and output terminals. The driving circuit is configured to generate the control signal so as to make a period for switching the first switch from a conductive state to a non-conductive state longer than a period for switching the first switch from the non-conductive state to the conductive state.

10 Claims, 12 Drawing Sheets

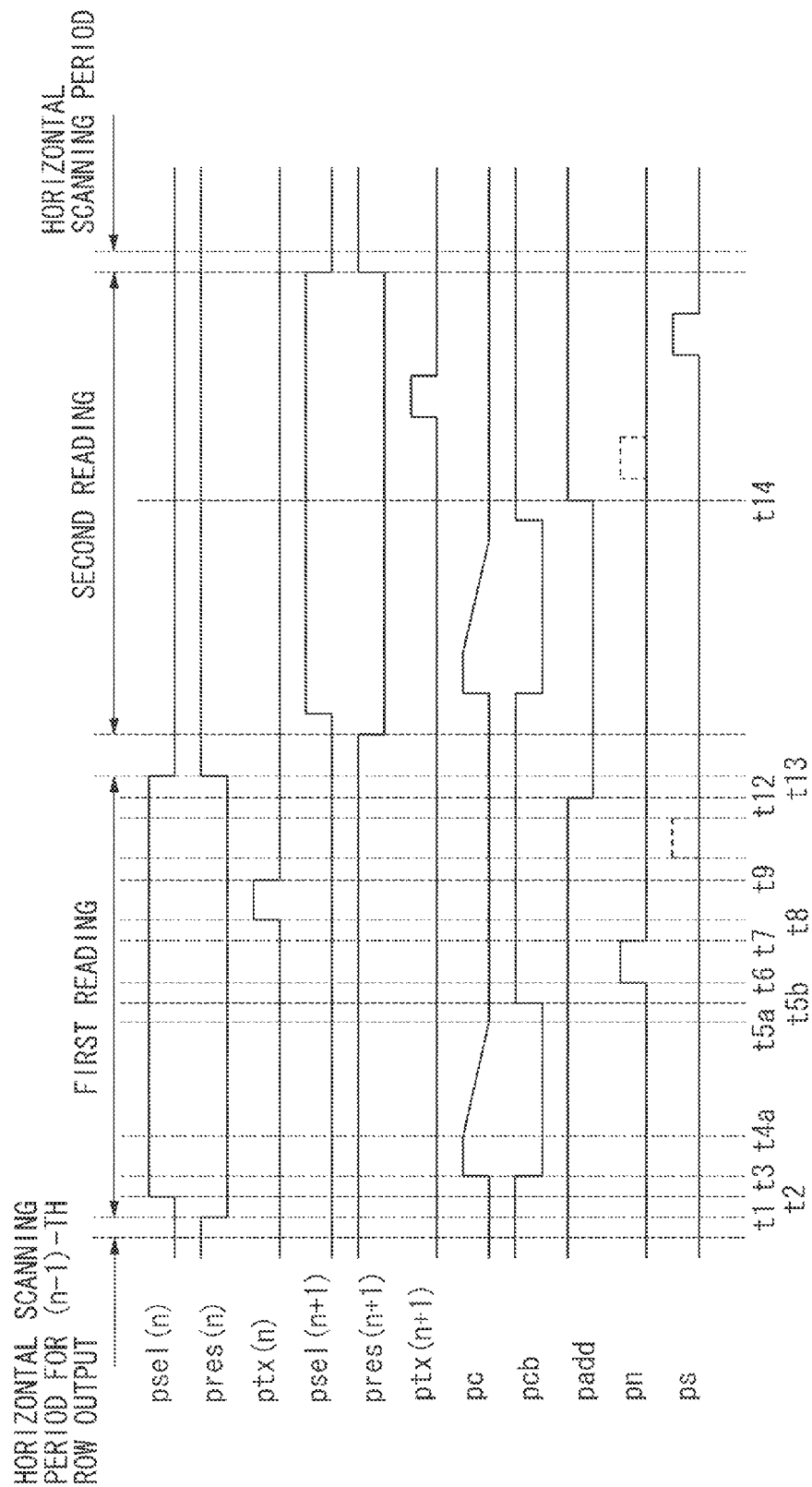

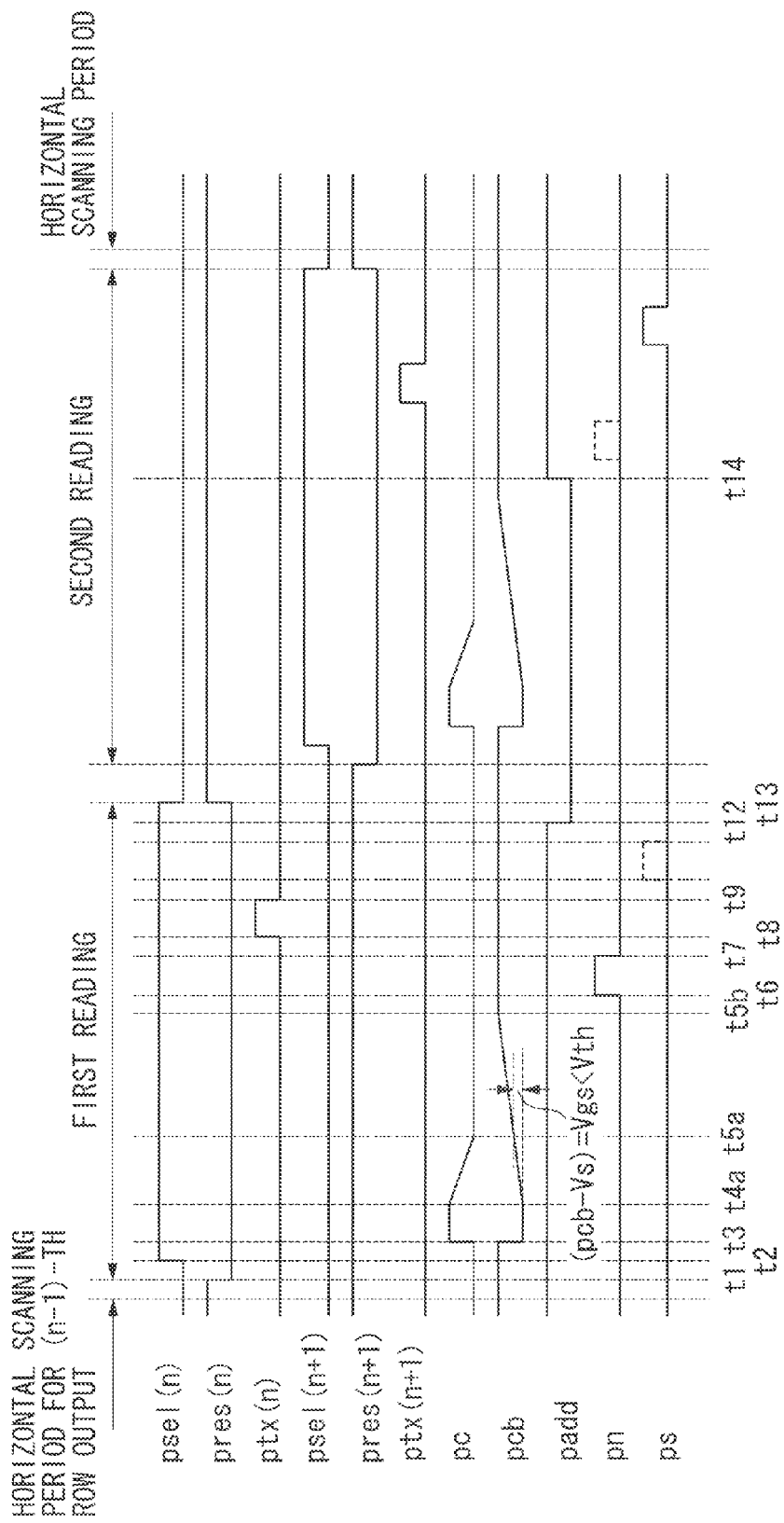

SOLID-STATE IMAGING APPARATUS

BACKGROUND OF THE INVENTION

1. Field of the Invention

One disclosed aspect of the embodiments relates to a solid-state imaging apparatus.

2. Description of the Related Art

Japanese Patent Application Laid-Open No. 2003-51989 discusses a technique for amplifying signals output from pixels of each column in a pixel array in which a plurality of pixels is two-dimensionally arranged, by a gain amplifier of each column. As a configuration of the gain amplifier for the each column, a capacitive feedback type inverting amplifier is described. When a metal-oxide semiconductor (MOS) switch provided at a feedback path is conductive, the gain amplifier is operated as a voltage follower to initialize an inverting input unit. Further, Japanese Patent Application Laid-Open No. 2003-51989 discusses a technique for reducing offset of each gain amplifier using a differential amplifier commonly provided for a plurality of gain amplifiers.

In recent years, demands for solid-state imaging apparatuses have been sophisticated, and one of the demands is downsizing of the solid-state imaging apparatus. As the solid-state imaging apparatus becomes smaller, a pixel size and a size of a column reading circuit need to be reduced.

SUMMARY OF THE INVENTION

The solid-state imaging apparatus includes a column reading circuit corresponding to a column. The column reading circuit is generally driven by a control signal from a driver provided at an end of the entire column reading circuit. A delay time of the control signal for the column reading circuit close to the driver is different from that for the column reading circuit away from the driver. When the number of the column reading circuits is increased, increase in the delay differences among the control signals due to increased load may become a problem. Particularly, the delay difference of the control signals when the MOS switch for short-circuiting an input and output of the gain amplifiers changes from a conductive state to a non-conductive state turns out to be a difference in a charge injection amount by the charge injection of the MOS switch. This difference corresponds to a difference in the offset between the column amplifiers and causes shading.

When the size of the column reading circuit is reduced, since two capacitances included with respect to the gain amplifier are large in size, it is essential to reduce a capacity value to downsize the column reading circuit. By reducing the capacity value of the two capacitances, the offset for the charge injection caused by the MOS switch is increased.

In addition, as the pixel size is reduced, pitches in the reading circuit need to be narrowed. The present inventor found that, when the pitches in the reading circuit are narrowed, the offset of the gain amplifier may not be sufficiently reduced by the differential amplifier. If the offset of the gain amplifier may not be sufficiently removed by the differential amplifier or a processing device provided outside of the solid-state imaging apparatus, an image signal in which a fixed pattern noise remains is output, so that quality of the acquired image may deteriorate.

According to an aspect of the embodiments, a solid-state imaging apparatus includes a plurality of unit pixels arranged in a matrix and configured to generate a signal by photoelectric conversion, a plurality of pixel output lines connected to each column of the plurality of unit pixels, a plurality of column amplifiers configured to amplify a signal of the plurality of pixel output lines, and a driving circuit configured to generate a control signal of the plurality of column amplifiers, wherein each of the plurality of column amplifiers comprises a first input terminal, a second input terminal, an output terminal, an input capacitance connected between the first input terminal and the second input terminal, and a first switch connected between the second input terminal and the output terminal, and wherein the driving circuit is configured to generate the control signal so as to make a period for switching the first switch from a conductive state to a non-conductive state longer than a period for switching the first switch from the non-conductive state to the conductive state.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 11 is a timing chart illustrating an example of an operation according to a fifth exemplary embodiment.

FIG. 12 is a timing chart illustrating an example of an operation according to a sixth exemplary embodiment.

DESCRIPTION OF EMBODIMENTS

Various exemplary embodiments, features, and aspects of the embodiments will be described in detail below with reference to the drawings. One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

Figure 1:
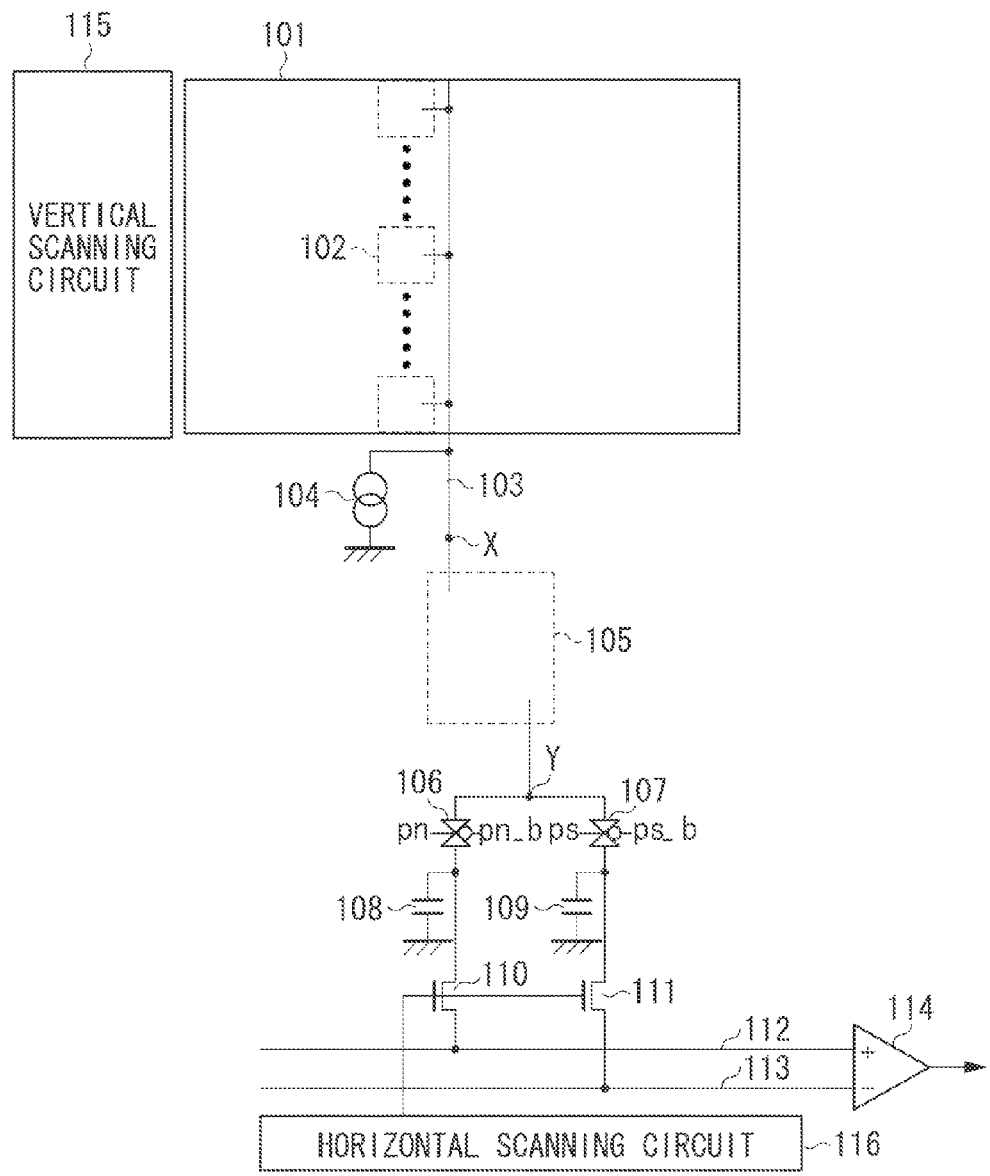
FIG. 1 illustrates an example of a configuration of a solid-state imaging apparatus according to a first exemplary embodiment.

FIG. 1 illustrates an example of a configuration of a solid-state imaging apparatus according to a first exemplary embodiment. A pixel region 101 is arranged in a two-dimensional matrix, and includes a plurality of unit pixels 102 for generating a signal by photoelectric conversion. In FIG. 1, three pixels arranged in a column are illustrated as a representative of the plurality of unit pixels 102 arranged in the two-dimensional matrix.

Figure 2:
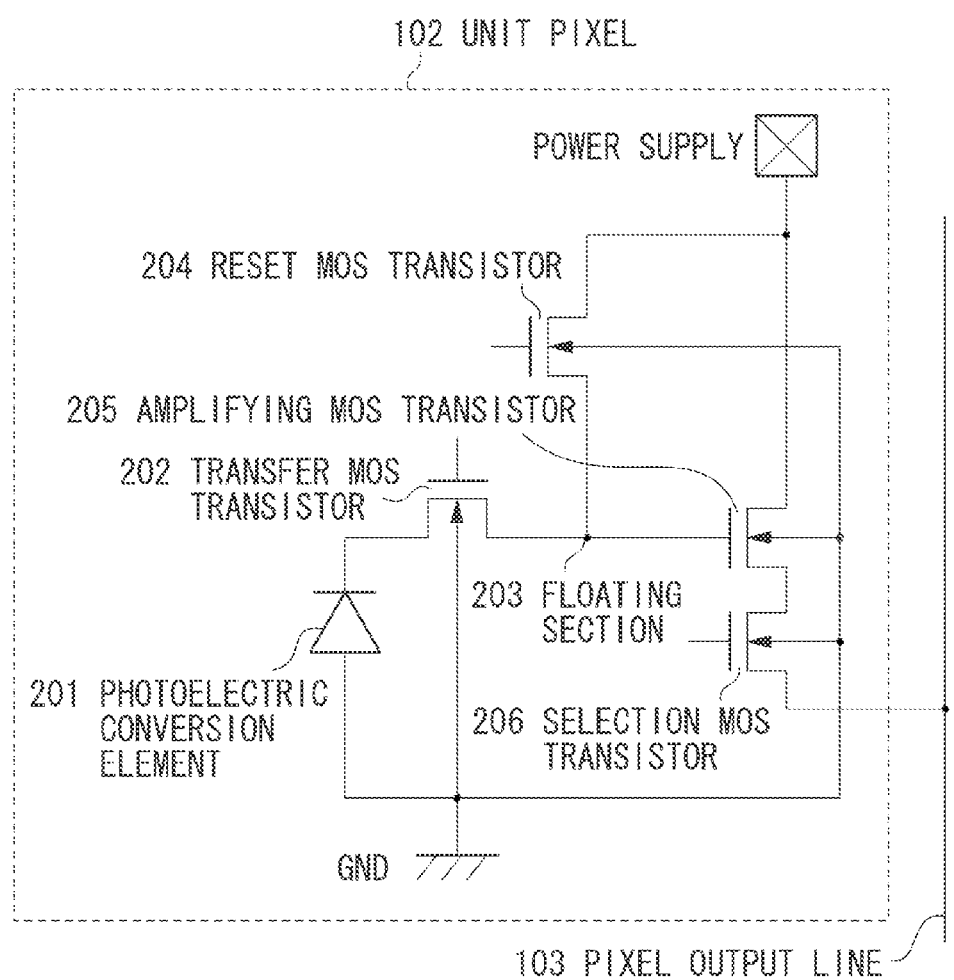
FIG. 2 illustrates an example of a configuration of a unit pixel illustrated in FIG. 1.

FIG. 2 illustrates an example of a configuration of the unit pixel 102 illustrated in FIG. 1. The unit pixel 102 includes a photoelectric conversion element 201, a transfer MOS transistor 202, a floating portion 203, a reset MOS transistor 204, an amplifying MOS transistor 205, and a selection MOS transistor 206. The photoelectric conversion element 201 is formed on a semiconductor substrate, and generates a signal by photoelectric conversion. The transfer MOS transistor 202 transfers the signal generated by the photoelectric conversion element 201 to the floating portion 203. The floating portion 203 converts a signal charge into a signal voltage. The reset MOS transistor 204 resets the floating portion 203 to a power source voltage. The amplifying MOS transistor 205 amplifies the signal of the floating portion 203. When a pixel is selected by the control signal, the selection MOS transistor 206 outputs the signal amplified by the amplifying MOS transistor 205 to a pixel output line 103. As illustrated in FIG. 1, a plurality of pixel output lines 103 is connected to each column of the plurality of unit pixels 102 arranged in the two-dimensional matrix. The pixel output line 103 is connected to a constant current load 104 and also connected to an input terminal X of a column amplifier 105. A terminal X illustrated in FIG. 1 represents an input terminal of the column amplifier 105 and a terminal Y represents an output terminal thereof.

Figure 3:
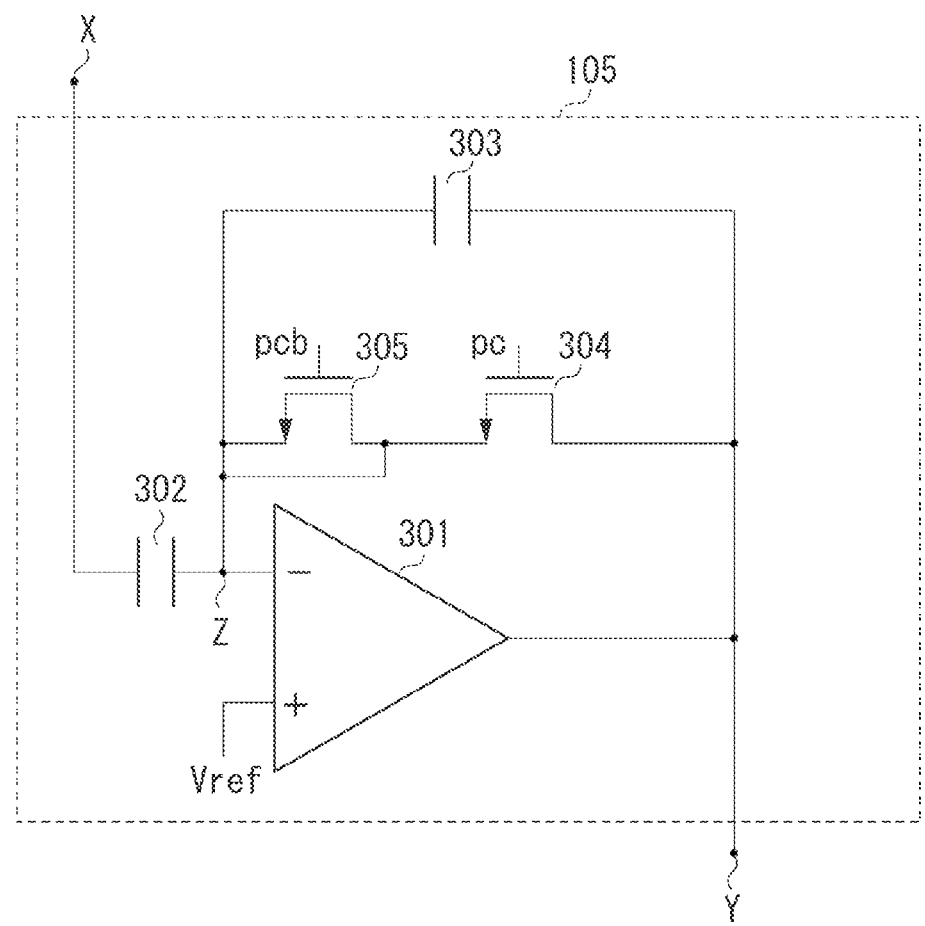
FIG. 3 illustrates an example of a configuration of a column amplifier illustrated in FIG. 1.

FIG. 3 illustrates an example of a configuration of the column amplifier 105 illustrated in FIG. 1. A plurality of the column amplifiers 105 amplifies signals of the plurality of pixel output lines 103 of each column. An input capacitance 302 is connected between the first input terminal X and a second input terminal Z of the column amplifier 105. The output terminal Y of the column amplifier 105 is connected to the second input terminal Z via a feedback capacitance 303. The second input terminal Z is connected to an inverting input terminal of an operational amplifier 301. A non-inverting input terminal of the operational amplifier 301 is connected to a node of a reference voltage Vref. A first switch 304 is connected between the output terminal Y and the second input terminal Z of the column amplifier 105. A source and a drain of a second switch (i.e., a MOS transistor) 305 are mutually short-circuited, and the second switch 305 is connected between the first switch 304 and the second input terminal Z. A control signal pc is applied to a gate of the first switch 304. A control signal pcb, which is an inverted signal of the control signal pc, is applied to a gate of the second switch 305. In this example, both the first and second switches include an n-channel MOS transistor.

Figure 4:
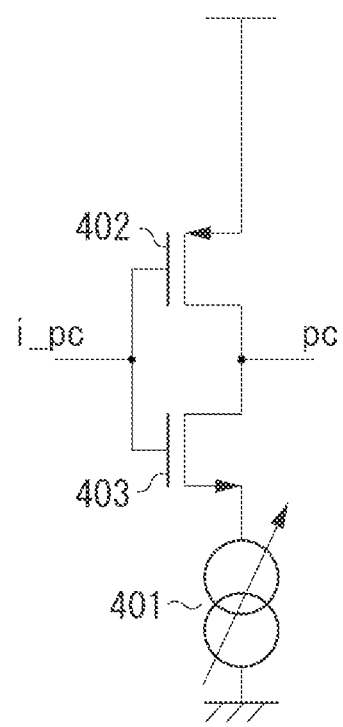
FIG. 4 is a circuit diagram illustrating an example of a configuration of a driving circuit for a control signal pc illustrated in FIG. 3.

FIG. 4 is a circuit diagram illustrating an example of a configuration of a driving circuit for the control signal pc illustrated in FIG. 3. The driving circuit illustrated in FIG. 4 generates the control signal pc of the first switch 304 of the plurality of column amplifiers 105 of each column. A signal i_pc is supplied from another circuit in a chip or from outside the chip. A first constant current source 401 is used for controlling a fall time of the control signal pc, and the current value thereof is variable. A source of a p-channel MOS transistor 402 is connected to a power source voltage node, a gate thereof is connected to a signal i_pc node, and a drain thereof is connected to a control signal pc node. A drain of an n-channel MOS transistor 403 is connected to the control signal pc node, a gate thereof is connected to the signal i_pc node, and a source thereof is connected to a ground potential node via the first constant current source 401. The above-described driving circuit is an inverter and outputs an inverted signal of the signal i_pc as the control signal pc.

Figure 5:
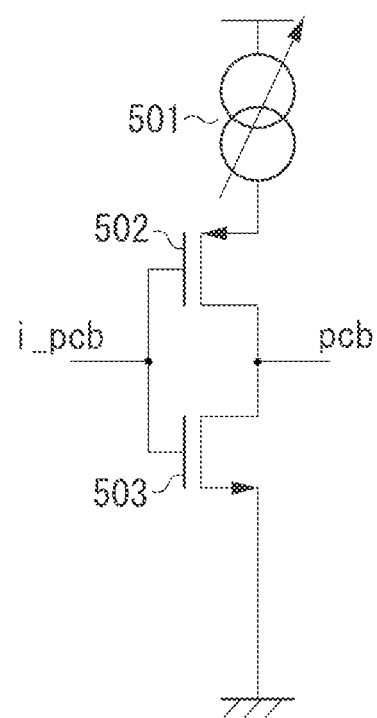
FIG. 5 is a circuit diagram illustrating an example of a configuration of a driving circuit for a control signal pcb illustrated in FIG. 3.

FIG. 5 is a circuit diagram illustrating an example of a configuration of the driving circuit for the control signal pcb illustrated in FIG. 3. The driving circuit illustrated in FIG. 5 generates the control signal pcb of the second switch 305 of the plurality of column amplifiers 105 of the each column. A second constant current source 501 is used for controlling a rise time of the control signal pcb, and the current value is variable. A source of a p-channel MOS transistor 502 is connected to a power source voltage node via the second constant current source 501, a gate thereof is connected to a signal i_pcb node, and a drain thereof is connected to a control signal pcb node. The signal i_pcb is an inverted signal of the signal i_pc. A drain of an n-channel MOS transistor 503 is connected to the control signal pcb node, a gate thereof is connected to the signal i_pcb node, and a source thereof is connected to the ground potential node. The above-described driving circuit is the inverter and outputs the inverted signal of the signal i_pcb as the control signal pcb.

As illustrated in FIG. 1, holding capacitances 108 and 109 are connected to the output terminal Y of the column amplifier 105 via switches 106 and 107 respectively. The switches 106 and 107 are complementary MOS (CMOS) switches. The control signal pn and its inverted signal pn_b are applied to the switch 106. The control signal ps and its inverted signal ps_b are applied to the switch 107. The holding capacitances 108 and 109 are respectively connected to corresponding horizontal signal lines 112 and 113 via transfer switches 110 and 111. The horizontal signal lines 112 and 113 are connected to an input terminal of a differential amplifier 114. The differential amplifier 114 outputs a difference signal between the signals of the horizontal signal lines 112 and 113. A vertical scanning circuit 115 selects a row for reading a pixel within the pixel region 101. A horizontal scanning circuit 116 controls the transfer switches 110 and 111 to transfer the signals of the holding capacitances 108 and 109 to the horizontal signal lines 112 and 113 respectively. Accordingly, the horizontal scanning circuit 116 may sequentially select the reading column.

Figure 6:
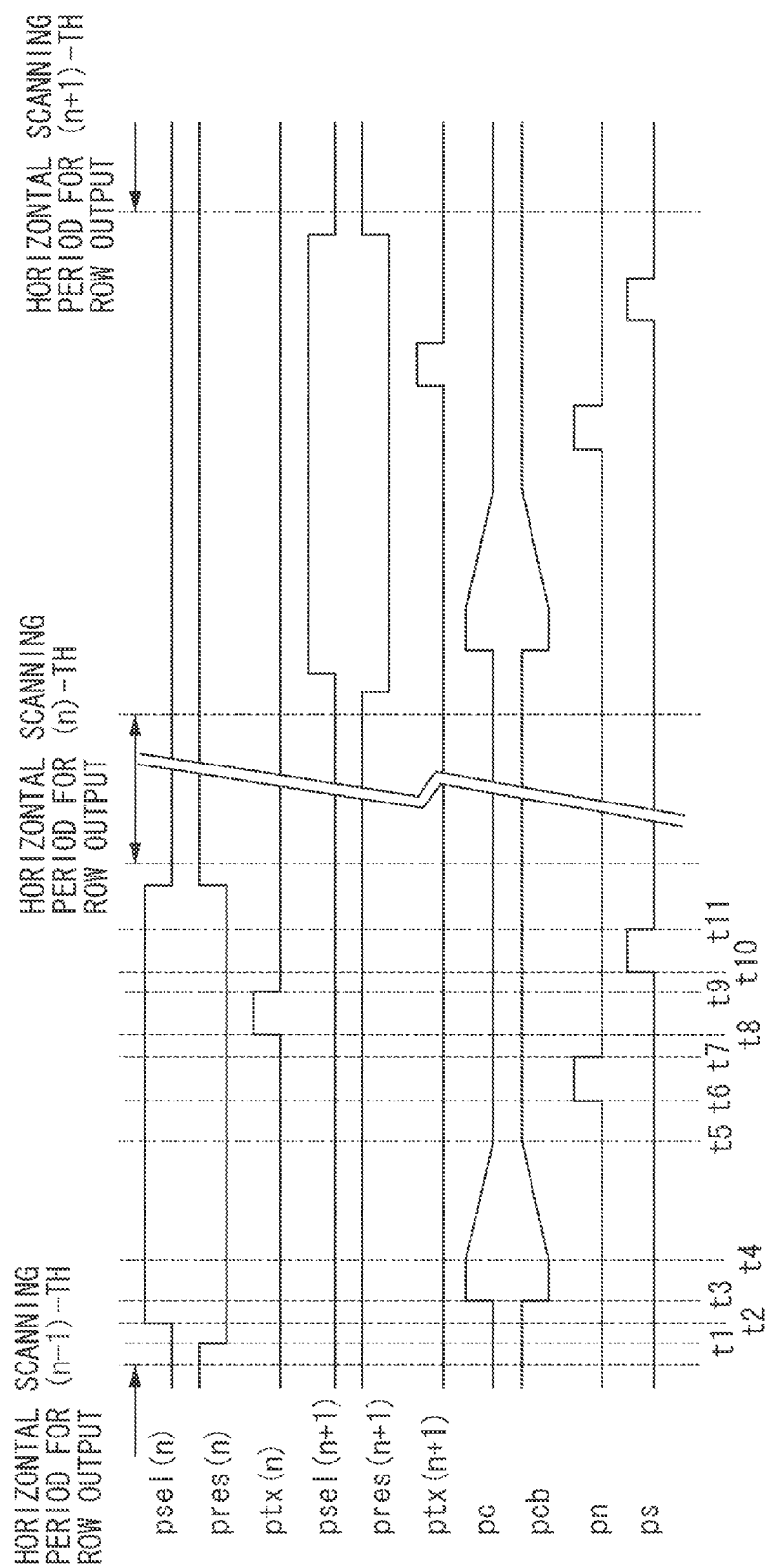
FIG. 6 is a timing chart illustrating an example of an operation of the solid-state imaging apparatus illustrated in FIG. 1.

FIG. 6 is a timing chart illustrating an example of an operation of the solid-state imaging apparatus illustrated in FIG. 1. A signal psel (n) is a control signal applied to the gate of the selection MOS transistor 206 at an n-th row. A signal pres (n) is a control signal applied to the gate of the reset MOS transistor 204 at the n-th row. A signal ptx (n) is a control signal applied to the gate of the transfer MOS transistor 202 at the n-th row.

Further, a signal psel (n+1) is a control signal applied to the gate of the selection MOS transistor 206 at an (n+1)-th row. A signal pres (n+1) is a control signal applied to the gate of the reset MOS transistor 204 at the (n+1)-th row. A signal ptx (n+1) is a control signal applied to the gate of the transfer MOS transistor 202 at the (n+1)-th row.

At a time t1, when the vertical scanning circuit 115 selects the unit pixel 102 at the n-th row, a level of the reset signal pres (n) becomes low and the reset MOS transistor 204 at the n-th row is turned off. Then, at a time t2, when a level of the selection signal psel (n) becomes high, the selection MOS transistor 206 at the n-th row is turned on, so that the source of the amplifying MOS transistor 205 at the n-th row becomes conductive with the pixel output line 103. A source follower circuit is formed by the unit pixel 102 at the selected n-th row and the constant current load 104, and then a signal of the unit pixel 102 in a reset state is read from the unit pixel 102 at the n-th row to the pixel output line 103.

In such a state, at a time t3, a level of the control signal pc becomes high, the first switch 304 is turned on, the second input terminal Z and the output terminal Y of the column amplifier 105 are short-circuited. Then the signal of the unit pixel 102 in the reset state is clamped to the reference voltage Vref. At a time t4, the control signals pc and pcb start changing. At a time t5, the level of the control signal pc becomes low, and a level of the control signal pcb becomes high. From the time t4 to the time t5, the first switch 304 changes from a conductive state to a non-conductive state. The control signal pcb starts changing at the time t4, and the level thereof becomes high at the time t5. The second switch 305 is the MOS switch, and from the time t4 to the time t5, a channel is formed beneath the gate.

According to the present exemplary embodiment, a change of the control signal pc from the time t4 to the time t5 during which the first switch 304 changes from the conductive state to the non-conductive state is determined by a current value of the first constant current source 401. The first constant current source 401 determines a gradient (fall time) with respect to a time of the control signal pc of the first switch 304. Accordingly, the control signal pc of the first switch 304 has the longer fall time than the rise time. More specifically, the driving circuit generates the control signal pc such that a period for switching the first switch 304 from the conductive state to the non-conductive state is longer than a period for switching the first switch 304 from the non-conductive state to the conductive state. With this arrangement, an influence caused by the difference in the delay time of the control signal pc may be reduced between the column amplifier 105 close to the driving circuits illustrated in FIGS. 4 and 5 and the column amplifier 105 away from the driving circuits illustrated in FIGS. 4 and 5, thus generation of shading may be suppressed. In addition, since the first switch 304 gradually changes from the conductive state to the non-conductive state in a period between the times t4 and t5, much of the charge forming the channel is absorbed to the output terminal Y. Thus, the offset itself due to the charge injection may be reduced.

The change in the rise time of the control signal pcb of the second switch 305 between the times t4 and t5 is determined by the current value of the second constant current source 501. The second constant current source 501 determines a gradient (rise time) with respect to the time of the control signal pcb of the second switch 305. The control signal pcb sets a period for switching a state in which the channel of the second switch 305 (MOS transistor) is not formed to a state in which the channel is formed longer than a period for switching the state in which the channel of the second switch 305 is formed to the state in which the channel is not formed. Therefore, there is no influence caused by the delay time of the control signal pcb. In addition, since charge due to the charge injection in the first switch 304 is used to form the channel of the second switch 305, the offset may be further reduced. When the control signals pc and pcb are logically inverted, the rise time of the control signal pc and the fall time of the control signal pcb may be controlled. At the time t5, the MOS transistor, which is the second switch 305, completes to form its channel.

Then, at a time t6, when a level of the control signal pn becomes high, the switch 106 is turned on, and a voltage Vout of the output terminal Y of the column amplifier 105 is stored as an N signal in the holding capacitance 108. The N signal is a voltage acquired by adding the offset to the reference voltage Vref appearing on the output terminal Y when the second input terminal Z and the output terminal Y of the column amplifier 105 are short-circuited.

At a time t7, the level of the control signal pn becomes low, and the switch 106 is turned off. Next, at a time t8, a level of the transfer pulse ptx (n) becomes high, and the transfer MOS transistor 202 at the n-th row is turned on. Then, the voltage corresponding to a voltage change state caused by an optical signal generated by the photoelectric conversion element 201 at the n-th row is read out to the pixel output line 103 via the amplifying MOS transistor 205. The level of the control signal pc becomes low, and the column amplifier 105 generates an S signal in which a voltage component acquired by adding an inversed gain to a voltage change component of the pixel output line 103 caused by the optical signal is superimposed on the N signal.

Then, at a time t9, the level of the transfer pulse ptx (n) becomes low, and the transfer MOS transistor 202 at the n-th row is turned off. In a period between times t10 and t11, the level of the control signal ps becomes high, the switch 107 is turned on, and then the S signal corresponding to the optical signal of the column amplifier 105 is read to the holding capacitance 109. At this point, since the second switch 305 and the switch 107 are the CMOS switches, even the high-leveled S signal may be sufficiently read to the holding capacitance 109.

In a horizontal scanning period at the n-th row, the N signal of the holding capacitance 108 and the S signal of the holding capacitance 109 at the column selected by the control of the transfer switches 110 and 111 in the horizontal scanning circuit 116 are sequentially read to the horizontal signal lines 112 and 113 respectively. The differential amplifier 114 acquires a difference between the signals of the horizontal signal lines 112 and 113 to output an optical response output signal. Subsequently, as with the above-described processing for the n-th row, the processing is performed for the (n+1)-th row and the following rows thereof.

As described above, according to the present exemplary embodiment, the offset difference and the offset itself caused by the difference in the distances from the plurality of column amplifiers 105 to the driving circuits illustrated in FIGS. 4 and 5 may be reduced. According to the present exemplary embodiment, an example is described in which the operational amplifier 301 is used as the column amplifier 105. However, if a grounded-source circuit is used in place of the operational amplifier 301, similar effects may also be acquired. When the grounded-source circuit is used, unlike the operational amplifier 301, the grounded-source circuit includes only one input terminal, and does not include a terminal supplying the reference voltage Vref. When the second input terminal Z and the output terminal Y of the column amplifier 105 are short-circuited, at the second input terminal Z and the output terminal Y, the voltage depends on a threshold voltage of a transistor included in the grounded-source circuit.

According to the present exemplary embodiment, a configuration including the first switch 304 and the second switch 305 is described, however, the effects may also be acquired if the second switch 305 is not included. Further remarkable effects may be acquired by providing the second switch 305. It is preferable that the second switch 305 may come into a conductive state at the same time as when the first switch 304 comes into a non-conductive state. However, a timing when the first switch 304 completely comes into the non-conductive state may be different from a timing when the second switch 305 completely comes into the conductive state. Further, according to the present exemplary embodiment, the example is described in which the constant current source is used to change the control signal at a constant change ratio with respect to the time. However, the control signal may not be changed at the constant change ratio, it may be gradually changed. According to the present exemplary embodiment, the shading or the fixed pattern noise may be reduced that are caused by the difference in the distances from the plurality of column amplifiers to the driving circuits.

Figure 7:
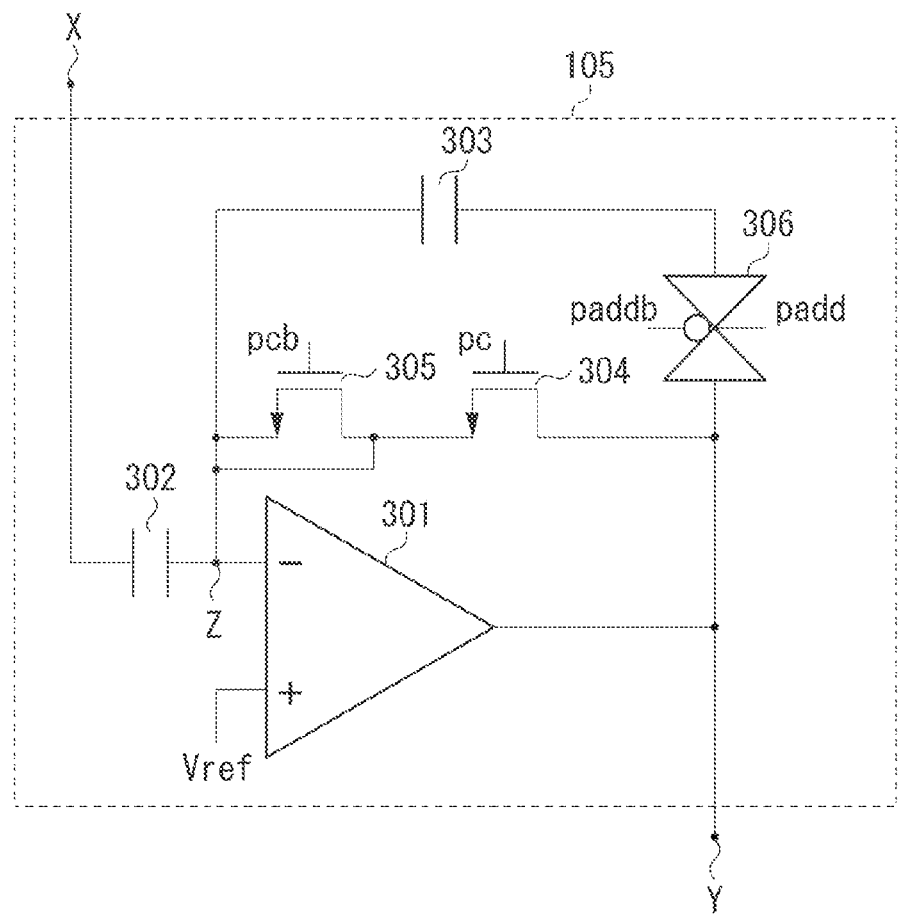
FIG. 7 illustrates an example of a configuration of a column amplifier according to a second exemplary embodiment.

FIG. 7 is an example of a configuration of a column amplifier 105 in a solid-state imaging apparatus according to a second exemplary embodiment. The solid-state imaging apparatus according to the present exemplary embodiment includes a configuration illustrated in FIG. 1. A difference between FIGS. 7 and 3 is that a CMOS switch 306 is provided between the feedback capacitance 303 and the output terminal Y in FIG. 7. The CMOS switch 306 is controlled by a control signal padd and its inverted signal paddb. According to the present exemplary embodiment, an addition mode is operated in which signals of the unit pixel 102 in the vertical direction are added up using the feedback capacitance 303 of the column amplifier 105. In the addition mode, the signals based on the plurality of unit pixels 102 connected to the same pixel output line 103 are added up. The driving circuit of the control signal pc illustrated in FIG. 4 and the driving circuit of the control signal pcb illustrated in FIG. 5 are the same as those described in the first exemplary embodiment. Different points between the present exemplary embodiment and the first exemplary embodiment will be described below.

Figure 8:
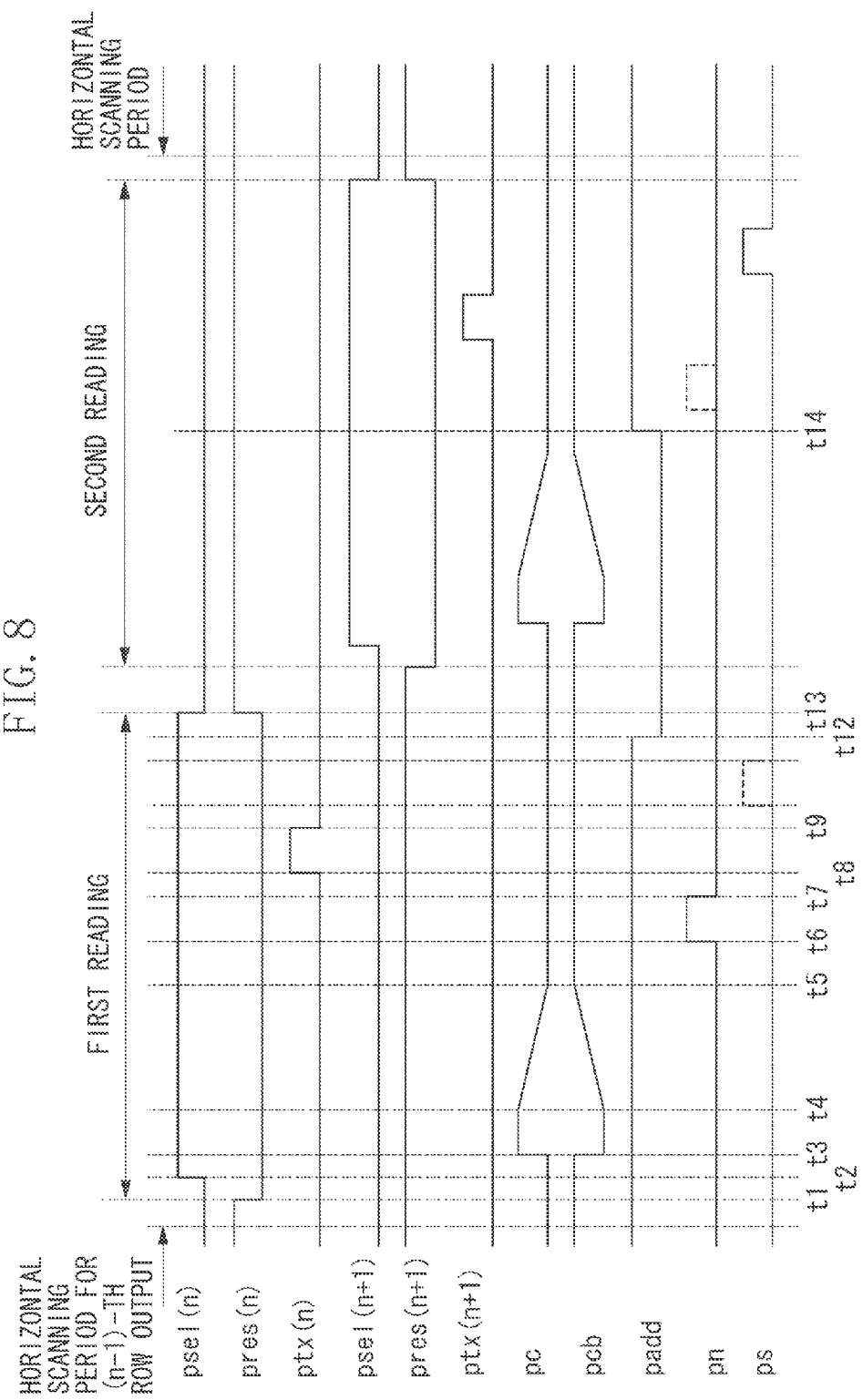
FIG. 8 is a timing chart illustrating an example of an operation of the solid-state imaging apparatus illustrated in FIG. 7.

FIG. 8 is a timing chart illustrating an example of an operation of the solid-state imaging apparatus illustrated in FIG. 7. Since the control signal paddb is the inverted signal of the control signal padd, and thus the control signal paddb is omitted from the timing chart in FIG. 8. According to the present exemplary embodiment, a signal of a first pixel (n-th row) read in a first reading period and a signal of a second pixel ((n+1)-th row) read in a second reading period are added up.

The same operations are performed as those of the first exemplary embodiment up to times t6 and t7, in which the level of the control signal pn is set to high to turn on the switch 106, and the voltage Vout of the output terminal Y of the column amplifier 105 is stored as the N signal in the holding capacitance 108.

After the level of the transfer pulse ptx (n) becomes low at the time t9, the level of the control signal ps does not become high, and at a time t12, the control signal padd changes from the high level to the low level. At this point, the CMOS switch 306 goes into the non-conductive state, and the S signal of the first pixel is stored in the feedback capacitance 303. Subsequently, at a time t13, the level of the selection signal psel (n) becomes low, the selection MOS transistor 206 at the n-th row is turned off, and then selection of the first pixel is canceled. A first reading period is described as above.

Processing for a second reading period is subsequently performed. As with the processing on the first pixel, the level of the reset signal pres (n+1) becomes low, and the reset MOS transistor 204 at the (n+1)-th row is turned off. The, the level of the selection signal psel (n+1) becomes high, and the selection MOS transistor 206 at the (n+1)-th row is turned on, so that the source of the amplifying MOS transistor 205 at the (n+1)-th row becomes conductive with the pixel output line 103. The signal of the unit pixel 102 in the reset state is read from the unit pixel 102 at the (n+1)-th row to the pixel output line 103.

Next, the level of the control signal pc becomes high, the first switch 304 is turned on, and the signal of the unit pixel 102 in the reset state is clamped to the reference voltage Vref. Then, the level of the control signal pc gradually becomes low. At this point, the charge injection occurs.

At a time t14, the level of the control signal padd becomes high, the CMOS switch 306 is turned on, and the feedback capacitance 303 and the output terminal Y go into a mutually conductive state. At this point, a signal is generated at the output terminal Y, in which the offset caused by the charge injection when the level of the control signal pc becomes low in the second reading period is superimposed on the S signal of the first pixel.

Subsequently, the level of the control signal pn does not become high but the level of the transfer pulse ptx (n+1) becomes high, and the transfer MOS transistor 202 at the (n+1)-th row is turned on. Then, the voltage corresponding to the voltage change state caused by the optical signal of the second pixel is read to the pixel output line 103. The column amplifier 105 generates a signal in which the voltage component acquired by adding the inversed gain to the voltage change component of the pixel output line 103 caused by the optical signal of the second pixel is superimposed on the S signal of the first pixel and the offset in the second reading period. Subsequently, the level of the control signal ps becomes high to turn on the switch 107. The signal of the output terminal Y of the column amplifier 105 is read to the holding capacitance 109 via the switch 107.

Next, in the horizontal scanning period, the signals from the holding capacitances 108 and 109 at the column selected by the control of the transfer switches 110 and 111 in the horizontal scanning circuit 116 are sequentially read to the horizontal signal lines 112 and 113 respectively. The differential amplifier 114 acquires the difference between the signals of the horizontal signal lines 112 and 113 to output an optical response output signal. The voltage to be stored in the holding capacitance 109 is acquired by adding only the shading and the offset in the first reading period to the reference voltage Vref. Therefore, the shading and the offset in the second reading period may not be removed from the optical response output signal acquired from the difference between the signals of the holding capacitances 108 and 109. According to the present exemplary embodiment, the shading and the offset in the second reading period may not be removed. Thus, using the driving circuits illustrated in FIGS. 4 and 5, it is particularly effective to reduce the shading caused by the influence of the difference between the delay times of the control signals pc, and the control signals pcb, and the offset caused by the charge injection.

According to the present exemplary embodiment, an operation for adding signals of two pixels is performed, however, it may be considered a case in which signals of more pixels are added. For example, in the case of an operation for adding signals of three pixels, the shading and the offset in the second and third reading periods are not removed, so that it is further effective to use the driving circuits illustrated in FIGS. 4 and 5.

As described in the first exemplary embodiment, the first constant current source 401 is used for the driving circuit illustrated in FIG. 4 for the control signal pc of the first switch 304. The first switch 304 gradually changes from the conductive state to the non-conductive state in the period between the times t4 and t5, thus the offset caused by the charge injection may be reduced. The more slowly the first switch 304 changes from the conductive state to the non-conductive state, the greater effects may be acquired. Further, according to the second exemplary embodiment, when the addition operation of the signal of the pixel in the vertical direction is performed using the feedback capacitance 303 of the column amplifier 105, it is particularly effective to use the driving circuits illustrated in FIGS. 4 and 5. On the other hand, if the first switch 304 is gradually driven from the conductive state to the non-conductive state in the period between the times t4 and t5, the reading time increases.

As described in the second exemplary embodiment, it is particularly effective to change the first switch 304 slowly from the conductive state to the non-conductive state by setting the current values of the first constant current source 401 and the second constant current source 501 variable. In an addition mode (driving mode) according to the second exemplary embodiment, the constant current values of the first constant current source 401 and the second constant current source 501 of the driving circuits illustrated in FIGS. 4 and 5 may be reduced as compared with the first exemplary embodiment. Further, in the driving mode that needs to increase a reading speed such as the driving mode at a high frame rate, the constant current values of the first constant current source 401 and the second constant current source 501 may be increased. The current values of the first constant current source 401 and the second constant current source 501 may be changed according to the plurality of driving modes.

According to the first and second exemplary embodiments, by providing the first constant current source 401 and the second constant current source 501, the shading or the fixed pattern noise may be reduced that are caused by the difference in the distances from the plurality of column amplifiers 105 to the driving circuits illustrated in FIGS. 4 and 5.

Figure 9:
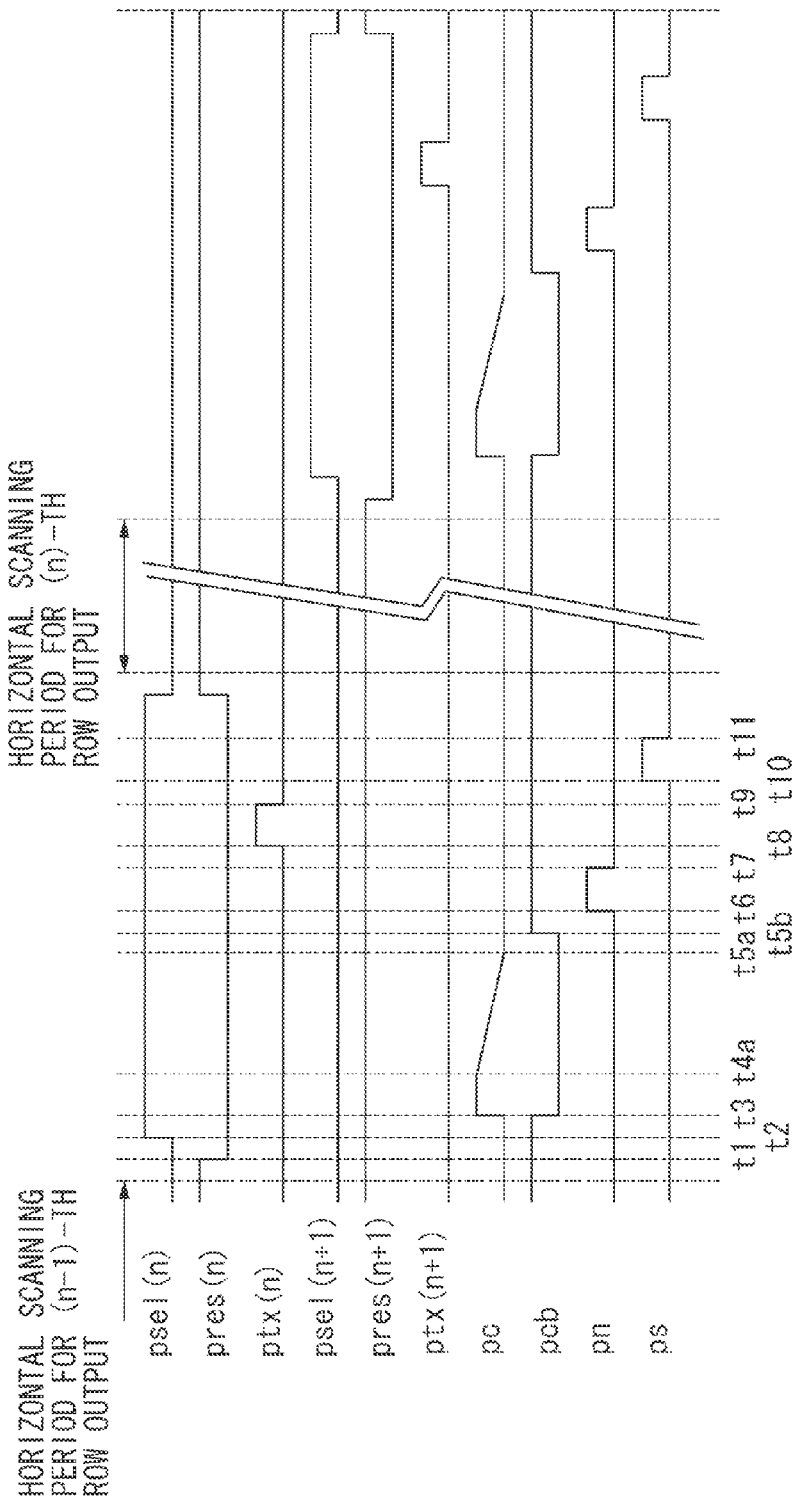
FIG. 9 is a timing chart illustrating an example of an operation according to a third exemplary embodiment.

FIG. 9 is a timing chart illustrating an example of an operation of the solid-state imaging apparatus illustrated in FIG. 1 according to a third exemplary embodiment. The column amplifier 105 includes a configuration illustrated in FIG. 3 as with the first exemplary embodiment. As with the first exemplary embodiment, the driving circuits for the control signals pc and pcb also include circuit configurations illustrated in FIGS. 4 and 5 respectively. Different points between the present exemplary embodiment and the first exemplary embodiment will be described below.

From a time t4a to a time t5a, the level of the control signal pc gradually becomes low, and the first switch 304 illustrated in FIG. 3 changes from the conductive state to the non-conductive state. The first constant current source 401 illustrated in FIG. 4 determines the fall time between the times t4a and t5a of the control signal pc. As with the first exemplary embodiment, by increasing the fall time of the control signal pc, the difference in the delay time of the control signal pc between the column amplifier 105 close to the driving circuit illustrated in FIG. 4 and the column amplifier 105 away therefrom may be reduced, and also the shading caused by the delay of the control signal pc may be reduced. The first switch 304 gradually changes from the conductive state to the non-conductive state during the times t4a and t5a, much of the charge forming the channel of the first switch 304 is absorbed to the output terminal Y. Thus, the offset itself due to the charge injection may also be reduced.

During the times t4a and t5a in which the level of the control signal pc gradually changes from high to low, the control signal pcb to be applied to the second switch 305 illustrated in FIG. 3 maintains the low level, and the second switch 305 maintains a state in which the channel is not formed. After the level of the control signal pc becomes low at the time t5a and the channel of the first switch 304 disappears, the level of the control signal pcb becomes high at the time t5b, and then the charge injection caused in the first switch 304 is absorbed to a channel portion of the second switch 305.

In the present exemplary embodiment, it is ideal if the first switch 304 and the second switch 305 may respectively match the timings for turning on and off for all column amplifiers 105 as in the case of the first exemplary embodiment. However, the timings cannot always be matched. For example, the respective loads of the control signals pc and pcb vary between the column amplifier 105 close to the driving circuit and the column amplifier 105 away therefrom illustrated in FIGS. 4 and 5, and thus each of the control signals pc and pcb may have different delay amounts. In such a case, the channel of the second switch 305 is formed in the timing in which disappearance degrees of the channels of the first switch 304 are different between the column amplifier 105 close to the driving circuit and the column amplifier 105 away therefrom illustrated in FIGS. 4 and 5. Thus, there is fear that offset variation and horizontal shading are generated.

A driving method according to the present exemplary embodiment may suppress the offset variation and the horizontal shading caused by the difference between the load of the control signal pc and that of the control signal pcb. At the time t5a, anode connected to the second switch 305 is set to the floating, and at the time t5b, the level of the control signal pcb to be applied to the second switch 305 becomes high. With this arrangement, the influence of the delay of the control signal pcb may be ignored between the column amplifier 105 close to the driving circuit illustrated in FIG. 5 and the column amplifier 105 away therefrom. Accordingly, the charge injection caused in the first switch 304 is absorbed to the channel portion of the second switch 305, and the absorbed amounts become equal in all column amplifiers 105. Therefore, by operating the solid-state imaging apparatus by the driving method according to the present exemplary embodiment, the delay caused by the difference between the load of the control signal pc and that of the control signal pcb may be ignored, and the horizontal shading and the offset variation may be suppressed.

Figure 10:
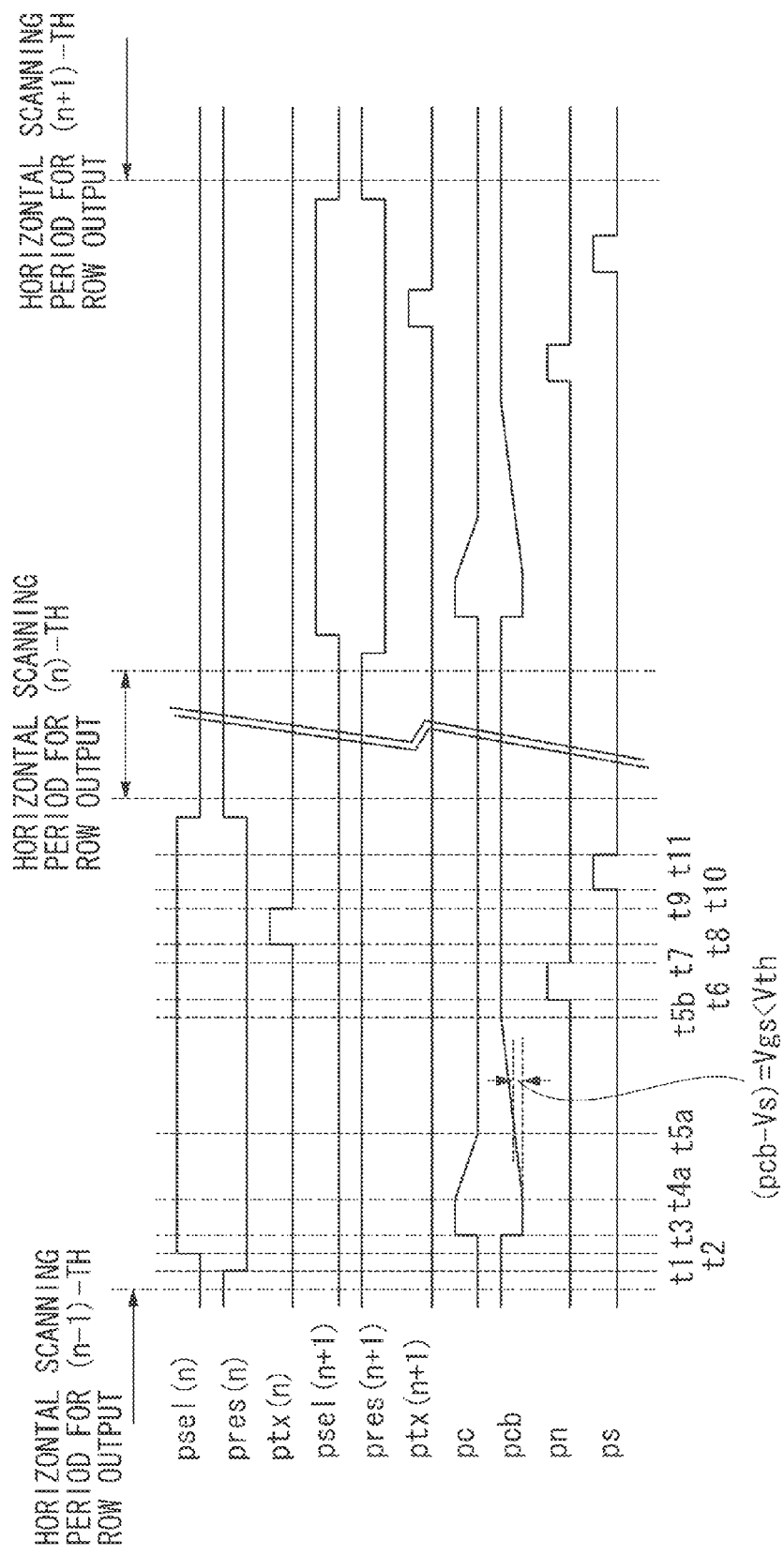
FIG. 10 is a timing chart illustrating an example of an operation according to a fourth exemplary embodiment.

FIG. 10 is a timing chart illustrating an example of an operation of the solid-state imaging apparatus illustrated in FIG. 1 according to a fourth exemplary embodiment. The present exemplary embodiment includes the same circuit configuration as that of the first exemplary embodiment. Different points between the present exemplary embodiment and the third exemplary embodiment will be described below.

From a time t4a to a time t5a, the level of the control signal pc gradually becomes low, and the first switch 304 illustrated in FIG. 3 changes from the conductive state to the non-conductive state. The first constant current source 401 illustrated in FIG. 4 determines the fall time (the times t4a and t5a) of the control signal pc. As with the first exemplary embodiment, by increasing the fall time of the control signal pc, the difference in the delay time of the control signal pc between the column amplifier 105 close to the driving circuit illustrated in FIG. 4 and the column amplifier 105 away therefrom may be reduced, and thus the shading caused by the delay of the control signal pc may be reduced. Further, since the first switch 304 gradually changes from the conductive state to the non-conductive state between the times t4a and t5a, much of the charge forming the channel of the first switch 304 is absorbed to the output terminal Y. Thus, the offset itself due to the charge injection may also be reduced.

From the time t4a to the time t5b, the control signal pcb to be applied to the second switch 305 illustrated in FIG. 3 gradually changes from the low level to the high level. When the level of the control signal pc becomes low at the time t5a, the voltage of the control signal pcb is controlled to satisfy a following equation.

$$(pcb-Vs)=Vgs<Vth$$

Vs represents the source voltage (=drain voltage) of the second switch 305, Vgs represents the voltage between the source and the gate of the second switch 305, and Vth represents the threshold voltage of the second switch 305. Since Vgs<Vth is satisfied at the time t5a, the channel is not yet formed in the second switch 305. The first switch 304 is turned off, the node connected to the second switch 305 is set to floating, and then the channel of the second switch 305 is formed. At the time t5b, the control signal pcb reaches the high level. In the period between the times t4a and t5b, the voltage Vgs between the source and the gate of the second switch 305 is lower than the threshold voltage Vth of the second switch 305, and changes toward the threshold voltage Vth thereof.

As described above, since a value of the control signal pcb at the time t5a is controlled to satisfy the equation (pcb−Vs)=Vgs<Vth, the influence from the delay of the control signal pcb may be ignored between the column amplifier 105 close to the driving circuit illustrated in FIG. 5 and the column amplifier 105 away therefrom. Therefore, the charge injection caused in the first switch 304 is absorbed to the channel portion of the second switch 305, and the absorbed amounts become equal in all column amplifiers 105. By performing the driving method according to the present exemplary embodiment, the influence of the delay caused by the difference between the load of the control signal pc and that of the control signal pcb may be ignored, and the horizontal shading and the offset variation may be suppressed.

FIG. 11 is a timing chart illustrating an example of an operation of the solid-state imaging apparatus illustrated in FIG. 1 according to a fifth exemplary embodiment. The column amplifier 105 includes a configuration illustrated in FIG. 7, as with the second exemplary embodiment. The driving circuits for the control signals pc and pcb also include the circuit configurations illustrated in FIGS. 4 and 5 respectively, as with the second exemplary embodiment. In FIG. 11, the control signal paddb used in FIG. 7 is the inverted signal of the control signal padd, and thus the control signal paddb is not illustrated.

As with the second exemplary embodiment, according to the present exemplary embodiment, a signal of the first pixel (n-th row) read in the first reading period and a signal of the second pixel ((n+1)-th row) read in the second period are added. Since the addition operation is performed in the similar manner to that in the second exemplary embodiment, different points between the present exemplary embodiment and the second exemplary embodiment will be described below.

As described in the second exemplary embodiment, in the addition operation using the feedback capacitance 303 of the column amplifier 105 illustrated in FIG. 7, the shading and the offset that are caused by the charge injection and generated in the first reading period and the second reading period are superimposed on the S signal. On the other hand, since the N signal is read only in the first reading period, the shading and the offset that are caused by the charge injection and generated in the first reading period is superimposed. Thus, if the differential processing of the S signal and the N signal is performed, the shading and the offset that are caused by the charge injection and generated in the second reading period cannot be removed, and the image quality may be deteriorated.

According to the present exemplary embodiment, the operation described below is performed to reduce the shading and the offset caused by the charge injection. From the time t4a to the time t5a in the first reading period, the level of the control signal pc is controlled to gradually become low, and the first switch 304 illustrated in FIG. 7 gradually changes from the conductive state to the non-conductive state. The time (the fall time from the time t4a to the time t5a) when the level of the control signal pc becomes low is controlled using the first constant current source 401 illustrated in FIG. 4. As with the second exemplary embodiment, by increasing the fall time of the control signal pc, the difference in the delay time of the control signal pc between the column amplifier 105 close to the driving circuit illustrated in FIG. 4 and the column amplifier 105 away therefrom may be reduced, and the shading caused by the delay of the control signal pc may also be reduced.

Further, since the first switch 304 gradually changes from the conductive state to the non-conductive state between the times t4a and t5a, much of the charge forming the channel of the first switch 304 is absorbed to the output terminal Y. Therefore, the offset itself due to the charge injection may also be reduced. During the times t4a and t5a, the control signal pcb maintains the low level, and the second switch 305 maintains the state in which the channel is not formed. The level of the control signal pc becomes low at the time t5a, the node connected to the second switch 305 is set to the floating, and then the level of the control signal pcb to be applied to the second switch 305 illustrated in FIG. 7 becomes high at the time t5b.

At the time t5b, the channel of the first switch 304 has disappeared, and the node connected to the second switch 305 is the floating. Thus, if the delay is generated in the control signals pcb between the column amplifier 105 close to the driving circuit illustrated in FIG. 5 and the column amplifier 105 away therefrom, the effects of cancelling the charge injection have no difference between the column amplifier 105 close to the driving circuit and the column amplifier 105 away therefrom. Therefore, if the second switch 305 is used, no difference in the shading and the offset is generated.

In the second reading period, the control signals pc and pcb are also controlled similar to that described above. By performing such control, the influence from the charge injection in the first and second reading periods may be reduced to the minimum. As described above, the driving method according to the present exemplary embodiment may reduce deterioration of image quality if the N signal in the second reading period cannot be removed in the addition operation using the feedback capacitance 303 of the column amplifier 105.

FIG. 12 is a timing chart illustrating an example of an operation of the solid-state imaging apparatus illustrated in FIG. 1 according to a sixth exemplary embodiment. The present exemplary embodiment includes the same circuit configuration as that of the fifth exemplary embodiment. In FIG. 12, the control signal paddb used in FIG. 7 is the inverted signal of the control signal padd, and thus the control signal paddb is not illustrated. The present exemplary embodiment is similar to the fifth exemplary embodiment in the control signals except for the control signals pc and pcb and the circuit configuration. Different points between the present exemplary embodiment and the fifth exemplary embodiment will be described below.

From the time t4a to the time t5a in the first reading period, the level of the control signal pc gradually becomes low, and the first switch 304 illustrated in FIG. 7 gradually changes from the conductive state to the non-conductive state. As with the fifth exemplary embodiment, the control signal pc is controlled to minimize the influence from the charge injection caused in the first switch 304. From the time t4a to the time t5b, the control signal pcb gradually changes from the low level to the high level, and at the time t5a when the level of the control signal pc becomes low, the voltage of the control signal pcb is controlled to satisfy a following equation.

$$(pcb-Vs)=Vgs<Vth$$

Vs represents the source voltage (=drain voltage) of the second switch 305 illustrated in FIG. 7, Vgs represents the voltage between the source and the gate of the second switch 305, and Vth represents the threshold voltage of the second switch 305. Since Vgs<Vth is satisfied at the time t5a, the channel is not yet formed in the second switch 305. The channel of the first switch 304 disappears, the node connected to the second switch 305 is set to the floating, and then the channel of the second switch 305 is formed. At the time t5b, the control signal pcb reaches the high level. In the period from the time t4a to the time t5b, the voltage Vgs between the source and the gate of the second switch 305 is lower than the threshold voltage Vth of the second switch 305 and changes toward the threshold voltage Vth thereof.

As described above, since a value of the control signal pcb at the time t5a is controlled to satisfy the equation (pcb−Vs)=Vgs<Vth, the influence from the delay of the control signal pcb may be ignored between the column amplifier 105 close to the driving circuit illustrated in FIG. 5 and the column amplifier 105 away therefrom. Accordingly, the charge due to the charge injection in the first switch 304 is absorbed to the channel portion of the second switch 305, and the absorbed amounts become equal in all column amplifiers 105.

In the second reading period, the control signals pc and pcb are also controlled similar to that described above. By performing the operation as described above, as with the fifth exemplary embodiment, the influence from the charge injection in the first and second reading periods may be reduced to the minimum. Further, if the N signal in the second reading period cannot be removed in the addition operation using the feedback capacitance 303 of the column amplifier 105, the deterioration of the image quality may be reduced.

The above-described exemplary embodiments describe only concrete examples for implementing the embodiments, and this is not to intend to limit the scope of the disclosure. Further, various modifications may be made in the embodiments without departing from the spirit or scope of the disclosure. For example, the disclosure may be applied to a configuration in which an analog-to-digital (AD) converter is provided at a rear portion of each column amplifier 105, in place of analog processing using the holding capacitances 108 and 109 and the differential amplifier 114. The AD converter converts an analog signal amplified by the column amplifier 105 into a digital signal. In such a case, the N signal and the S signal are subjected to the AD conversion, and then digital processing is performed on the difference between the both signals.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Applications No. 2011-223118 filed Oct. 7, 2011 and No. 2012-145713 filed Jun. 28, 2012, which are hereby incorporated by reference herein in their entirety.

What is claimed is:

1. A solid-state imaging apparatus comprising:
a plurality of unit pixels arranged in a matrix and configured to generate a signal by photoelectric conversion;
a plurality of pixel output lines connected to each column of the plurality of unit pixels;
a plurality of column amplifiers configured to amplify a signal of the plurality of pixel output lines; and
a driving circuit configured to generate a control signal of the plurality of column amplifiers,
wherein each of the plurality of column amplifiers comprises
a first input terminal,
a second input terminal,
an output terminal,
an input capacitance connected between the first input terminal and the second input terminal, and
a first switch connected between the second input terminal and the output terminal, and
wherein the driving circuit is configured to generate the control signal so as to make a period for switching the first switch from a conductive state to a non-conductive state longer than a period for switching the first switch from the non-conductive state to the conductive state.

2. The solid-state imaging apparatus according to claim 1, wherein each of the plurality of column amplifiers includes a metal-oxide-semiconductor (MOS) transistor in which a source and a drain are mutually short-circuited and connected between the first switch and the second input terminal.

3. The solid-state imaging apparatus according to claim 2, wherein the driving circuit is configured to generate the control signal so as to make a period for switching a state in which a channel of the MOS transistor is not formed to a state in which the channel is formed longer than a period for switching the state in which the channel of the MOS transistor is formed to the state in which the channel is not formed.

4. The solid-state imaging apparatus according to claim 2, wherein a control signal of the MOS transistor is an inverted signal of a control signal of the first switch.

5. The solid-state imaging apparatus according to claim 2, wherein, in a period for switching the first switch from the conductive state to the non-conductive state, the MOS transistor maintains a state in which a channel is not formed.

6. The solid-state imaging apparatus according to claim 2, wherein, in a period for switching the first switch from the conductive state to the non-conductive state, a voltage between the source and the gate of the MOS transistor is lower than a threshold voltage of the MOS transistor, and changes toward the threshold voltage thereof.

7. The solid-state imaging apparatus according to claim 1, wherein, the driving circuit includes a constant current source for determining a gradient with respect to a time of the control signal.

8. The solid-state imaging apparatus according to claim 7, wherein, a current value of the constant current source changes according to a plurality of driving modes.

9. The solid-state imaging apparatus according to claim 8, wherein the plurality of driving modes includes an addition mode for adding signals based on a plurality of unit pixels connected to the same pixel output line.

10. The solid-state imaging apparatus according to claim 1, further comprising an analog-to-digital (AD) converter configured to convert a signal amplified by the column amplifier into a digital signal.

* * * * *